United States Patent

Wilens et al.

[15] 3,694,703

[45] Sept. 26, 1972

[54] HEAT DISSIPATOR FOR ENCASED SEMICONDUCTOR DEVICE HAVING HEAT TAB EXTENDING THEREFROM

[72] Inventors: Seymour Wilens, Wantagh; Edmund G. Trunk, East Meadow, both of N.Y.

[73] Assignee: The Staver Company, Incorporated, Bay Shore, N.Y.

[22] Filed: Sept. 2, 1970

[21] Appl. No.: 68,994

[52] U.S. Cl..........317/234 R, 317/234 A, 317/234 P, 29/591, 165/80, 313/42

[51] Int. Cl...............................H01l 3/00, H01l 5/00

[58] Field of Search....317/234, 235, 1, 3, 6; 174/15, 174/35.5; 29/589, 590, 591; 165/80, 185; 313/42, 43, 44, 45

[56] References Cited

UNITED STATES PATENTS

| | | | |
|---|---|---|---|
| 2,771,278 | 11/1956 | Slack | 165/80 |
| 2,852,594 | 9/1958 | Amand | 165/80 X |
| 2,955,242 | 10/1960 | Parziale | 317/234 |
| 3,213,324 | 10/1965 | McAdam | 165/80 X |
| 3,222,580 | 12/1965 | Curll | 317/235 |
| 3,260,787 | 7/1966 | Finch | 317/234 |
| 3,484,659 | 12/1969 | Nagai et al. | 317/234 A |
| 3,548,927 | 12/1970 | Spurling | 317/234 A |
| 3,572,428 | 3/1971 | Monaco | 317/234 A |

FOREIGN PATENTS OR APPLICATIONS

| | | | |
|---|---|---|---|
| 928,848 | 6/1963 | Great Britain | 165/80 |

*Primary Examiner*—John W. Huckert
*Assistant Examiner*—Andrew J. James
*Attorney*—James and Franklin

[57] ABSTRACT

A heat dissipator is adapted for use with an encased semiconductor device having a heat conductive tab extending through its casing. The dissipator comprises a stamped sheet metal body having a slot formed in one edge thereof by means of bent over fingers, the slot being adapted to firmly engage the heat conductive tab on the transistor to provide a solid heat path from the tab to the sheet metal body. In one embodiment the fingers are bent over along a line perpendicular to the direction of their extension. In the second and third embodiments the projections are bent over along a line oblique to the direction of their extension. An offset leg is provided in two embodiments for stabilization of the semiconductor body on a circuit board.

9 Claims, 12 Drawing Figures

INVENTORS
SEYMOUR WILENS
EDMUND G. TRUNK
BY James and Franklin
ATTORNEY

INVENTORS
SEYMOUR WILENS
EDMUND G. TRUNK
BY
James and Franklin
ATTORNEY

HEAT DISSIPATOR FOR ENCASED SEMICONDUCTOR DEVICE HAVING HEAT TAB EXTENDING THEREFROM

This invention relates to heat dissipators for electronic devices and in particular for use with semiconductors.

Semiconductor devices are today being used at an ever increasing rate. Semiconductor components such as transistors are small in size but may be designed to handle large amounts of power. One of the primary problems associated with such devices is the dissipation of the relatively enormous amounts of heat that they generate. This has led to the use of heat dissipators, often referred to as heat sinks. In order to achieve thermal stability heat sinks employed in the past have been so large and heavy that they sometimes offset the space and weight advantages gained by the use of semiconductors. Prior art dissipators for use with conventional metal encased transistors have been generally designed to fit onto the metal casing through which the generated heat is conducted. A recently developed transistor utilizes a silicon substrate disposed on one surface of an elongated metal strip. The strip and substrate are covered with a dielectric casing molded therearound, the metal strip extending through the casing at one end of the body and adapted to function as a heat conductive tab. The casing may be a plastic or ceramic or any other suitable dielectric material. No metal housing is needed or used. The body is generally rectangular in shape, with three transistor leads projecting from the other end thereof.

In the past, the mounting of the transistor, whether of the type having a metallic or plastic casing, on the heat sink structure has presented difficulties. The most common method of attaching the heat sink to the device is by soldering or the like. This method involves considerable time and expensive equipment and in some cases the heat sink cannot be re-used once the transistor is found to be defective and replaced.

In the case of plastic encased semiconductor devices having an exposed metallic surface, physical attachment to the heat sink presents additional problems. Thus, if a screw is used, a torque limiting tool may be required to insure that the screw is tight enough to prevent shifting and loosening but not so tight as to chip or break the plastic casing. Moreover, whether or not a screw is used, the particular mounting arrangement must be carefully planned in accordance with the specific layout and space requirements of the final circuit.

The primary object of the present invention is generally to provide an improved heat dissipator for semiconductor device.

More particularly it is an object of the present invention to provide heat dissipators which are light in weight, compact in dimension and low in cost.

It is yet another object of the present invention to provide heat dissipators adapted for use with encased semiconductor components having heat conductive tabs extending therefrom, said dissipator being adaptable for use with various tab configurations.

It is a further object of the present invention to provide a heat dissipator of the type described for use with semiconductor devices wherein the device may be firmly attached to the dissipator in a good heat conductive relationship in a simple expedient manner without the use of tools.

It is still another object of the present invention to design a heat dissipator for semiconductor devices formed from a single sheet metal body and adapted for use with a variety of shapes and sizes of semiconductor devices and in various circuit board arrangements including those where the dissipator must fit into shallow areas where there is a limitation on height.

To those ends the heat dissipator of the present invention comprises a stamped sheet metal body having two fingers extending therefrom. The fingers are bent towards each other over the body to form a slot adapted to receive the heat conductive tab of a transistor or other semiconductor device. In one embodiment the fingers extend from the base portion of the metal sheet in opposite transverse directions and are bent over towards each other at least partially over said base portion. In a second embodiment the fingers extend longitudinally in the same direction from the base portion of the metal body and are bent along lines oblique to said longitudinal direction towards each other and at least partially over the base portion to form a longitudinally extending slot. Also included is an offset leg portion adapted to stabilize the transistor body when the tab is inserted in the slot. The third embodiment is similar to the second embodiment with the exception that the base portion is bent along a transverse line through an angle of more than 90°. In all embodiments the sheet metal body is provided with a plurality of excised and displaced portions to increase heat dissipation.

To the accomplishment of the above, and to such other objects as may hereinafter appear, the present invention relates to heat dissipators for semiconductor devices as defined in the appended claims and as described in this specification, taken together with the accompanying drawings, in which:

Figures 1, 1A, 2, 3, 4, 4A, 5, 6:
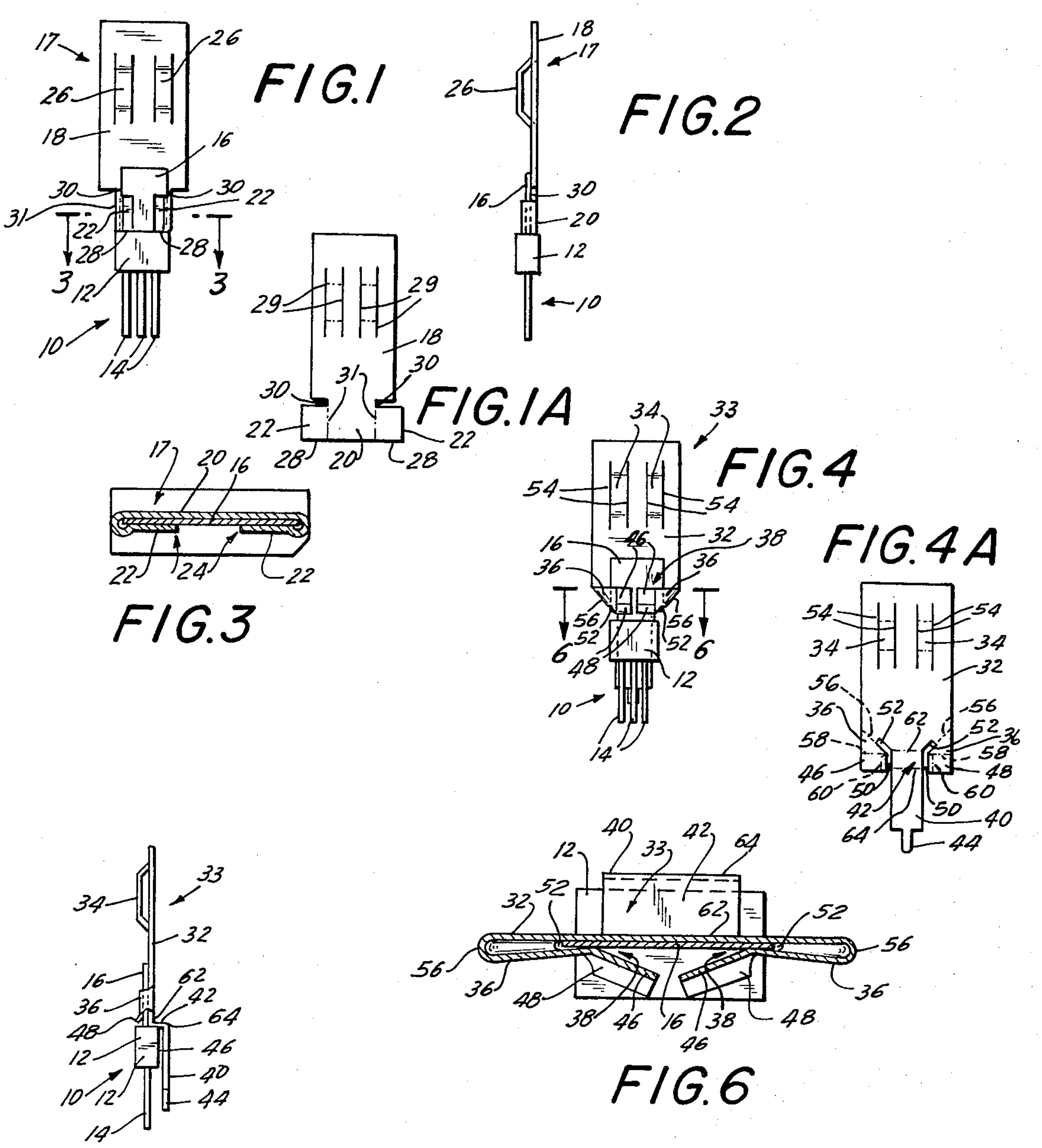
FIG. 1 is a plan view of a first embodiment of a heat dissipator constructed in accordance with the present invention shown operatively connected to a semiconductor transistor.
FIG. 1A is a plan view of the sheet metal blank used to form the dissipator of FIG. 1.
FIG. 2 is a side elevational view of the heat dissipator-transistor combination of FIG. 1.
FIG. 3 is a cross-sectional view taken along the line 3—3 of FIG. 1.
FIG. 4 is a plan view of a second embodiment of a heat dissipator constructed in accordance with the present invention with a semiconductor transistor operatively connected thereto.
FIG. 4A is a plan view of the sheet metal blank used to form the dissipator of FIG. 4.
FIG. 5 is a side elevational view of the heat dissipator-transistor combination of FIG. 4.
FIG. 6 is a cross-sectional view taken along the line 6—6 of FIG. 4.

Referring to the drawings, and more particularly to FIG. 1, there is illustrated a transistor generally designated 10 having a plastic encased body 12 and three thin wire leads 14 projecting in collateral relation from one end of body 12. A metallic tab 16 projects from the other end of body 12 and is shown properly attached to the heat dissipator of the present invention. The transistor body 12 is of the plastic encased type. The semiconductor substrate encased therein is in planar heat conductive relationship to the tab 16 in the interior of the casing. The body 12 is rectangular and is quite small, typically approximately three-eighths inch long, one-fourth inch wide and one-sixteenth inch thick. Nevertheless it is a power transistor capable of handling substantial power provided there is adequate heat dissipation.

The heat dissipator generally designated 17 is formed of thin sheet metal, for example beryllium copper. As shown in FIGS. 1–3, it comprises a generally rectangular base portion 18 having a portion 20 (FIG. 2) extending therefrom. Portion 20 is provided with two oppositely extending fingers 22 which are bent over approximately 180° to a position parallel to one surface of portion 20 t0 form a slot 24 which is best seen in FIG. 3. Base portion 18 is provided with a plurality of excised and displaced strips 26 for improved convective heat dissipation. Displaced strips 26 are not exactly louvers, because they are excised from the main body of the metal at both edges of the strip, as will be clear from an inspection of FIG. 2, but for convenience the strips will be referred to as louvers. A true louver may be used but it is difficult to fabricate unless the metal is extremely thin. The selection of the direction of these louvers is largely dependent upon the preference of the user and they will generally be designed in accordance with the configuration of the enclosure in which the dissipator is used.

Although the device is not limited to particular dimensions, in some preferred examples now being made the base portion 18 is 1.25 by 0.625 inch and the slot 24 is 0.475 inch in width by 0.475 inch long. The sheet metal has a thickness of 0.01 inch, but the same units may be satisfactorily manufactured from thicker sheets. The excised strips 26 are displaced from the base portion 18 a distance of 0.06 inch. The slot 24 is preferably of a thickness sufficient to snugly receive the thin metal tab 16 emanating from the transistor body 12. To facilitate insertion of the tab 16 into the slot 24, the edge 28 of the fingers 22 at the receiving end of the slot may be slightly angularly displaced away from portion 20 so as to easily accommodate the leading edge of tab 16. In this case the remainder of fingers 22 may be bent somewhat closer to portion 20 so that they resiliently receive tab 16 for snug retention therein. As best seen in FIG. 3 once the tab 16 is inserted within slot 24 there is a solid planar heat conductive engagement between portion 20 and tab 16 so as to allow for highly efficient heat transfer from the tab to portion 20 and thence to base portion 18 for substantial convective heat dissipation.

It will be apparent that the dissipator 17 may be conveniently fabricated from a single piece of sheet metal as by stamping. FIG. 1A illustrates a typical blank from which the dissipator of FIG. 1 may be fabricated. As there shown the blank is generally rectangular with two cut out portions 30 defining oppositely extending fingers 22. Fingers 22 are shown extending transversely beyond the edges of base portion 18. While this necessitates scrapping some of the sheet material during fabrication, it is often necessary for the accommodation of a large tab 16 while at the same time maintaining optimum heat dissipation within a given size limitation on base portion 18. Lines 29 represent cut marks defining louvers 26 in the final product. After the blank is cut, strips 26 are displaced from the base portion 18 and fingers 22 are bent over along lines 31 to the configuration illustrated in FIG. 3. The metallic sheet may be anodized or coated with black paint having a dull or matte finish in order to improve heat conduction but this is normally left to the user.

A second embodiment of the dissipator is illustrated in FIGS. 4–6. As there shown the device 33 is similar to the embodiment of FIG. 1 in that there is a rectangular base portion 32 and louvers 34 excised and displaced therefrom for increased convective heat dissipation. It will be observed, however, particularly with reference to FIG. 4A that in this case the fingers 36 forming the slot initially extend directly from base portion 32 in the same direction and are bent over along lines 56 approximately 45° to their direction of extension to provide a slot 38 generally of trapazoidal shape. As best shown in FIG. 5 a leg 40 extends from base portion 32 at the receiving edge of slot 38 and is offset from the plane thereof by a connecting portion 42. A small projection 44 (see FIG. 4A) extends from leg 40 and is adapted to be inserted in a corresponding slot on a circuit board. Thus in practice both leads 14 on transistor 10 and projection 44 on dissipator 33 are inserted into a circuit board and permanently attached thereto, as for instance by flow soldering to the under side of the board. It will be apparent that in this manner the transistor dissipator combination is firmly stabilized on the circuit board and bending or twisting of the relatively thin leads 14 is effectively prevented. Offset leg 40 is spaced somewhat from the transistor body at 46 so as to insure against electrical contact or sparking between the dissipator and leads 14.

As best shown in FIG. 6 fingers 36 are bent angularly away from base portion 32 at their terminal edges 46 and are slightly bent outwardly at 48 defining the entrance end of slot 38. Again this facilitates the insertion of tab 16 into slot 38.

The fabrication of the dissipator illustrated in FIG. 4 is best described with reference to FIG. 4A which shows the stamped sheet from which the dissipator is formed. As there illustrated leg 40 extends centrally from the generally rectangular sheet comprising the base portion and the two fingers 36 and is separated from fingers 36 on either side by longitudinally extending cut out slits 50. Fingers 36 are slightly undercut by means of narrow notches 52 extending from slits 50 at an angle of approximately 45°. Again, cut lines 54 on base portion 32 define louvers 34 in the final product. In practice fingers 36 are bent over onto one surface of base portion 32 along lines 56 which are aligned with narrow notches 52. It will be apparent that with this configuration a wider slot 38 is provided with the use of less material than in the embodiment of FIG. 1. Moreover, it will be apparent that for a dissipator with a given surface dissipation area the embodiment of FIG. 4 may be fabricated with less waste or scrap. Once folded over onto base portion 32, fingers 36 are bent outwardly along lines 58 and 60 to provide a wide cross-section at the receiving end of slot 38. Leg 42 is then bent 90° along lines 62 and 64 in opposite directions to the offset configuration illustrated in FIG. 5. Strips 34 are bent out to the position shown in FIG. 5. It will be appreciated that leg 42 may be fabricated in a variety of shapes and/or sizes to allow for various mounting configurations on a circuit board or other mounting device. Moreover, it is possible to eliminate leg 42 completely as in the embodiment of FIG. 1.

Figure 7:
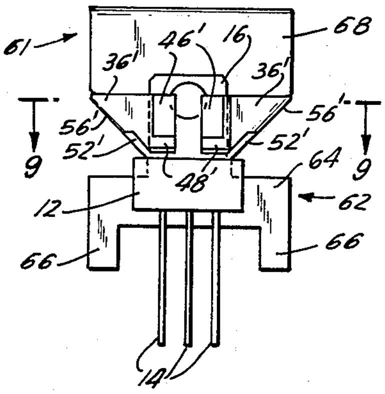
FIG. 7 is a plan view of a third embodiment of a heat dissipator constructed in accordance with the present invention showing a semiconductor transistor operatively connected thereto.
Figure 8:
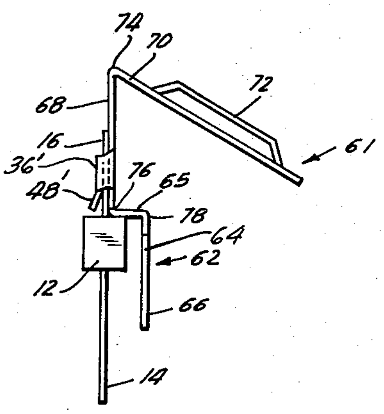
FIG. 8 is a side elevational view of the heat dissipator-transistor combination of FIG. 7.
Figure 9:
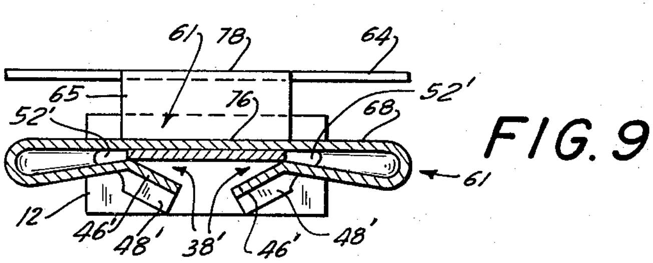
FIG. 9 is a cross-sectional view taken along the line 9—9 of FIG. 7.

The dissipator 61 illustrated in FIGS. 7–9 is designed for use in shallow areas where there is a limitation on height. It will be seen that the slot configuration is identical to that shown in FIGS. 4–6, and therefore like parts will be designated by like reference numerals with the addition of a prime. The leg portion 62 in this configuration comprises a cross member 64 offset at 65 (FIG. 8) and with two narrow legs 66 depending therefrom. As previously noted the leg portion is designed in accordance with the particular circuit board configuration with which it is intended to be used. As best seen in FIG. 8, the base portion generally designated 68 is bent along a transverse line 74 through more than 90°, the bent portion 70 remote from the slot forming an angle of approximately 60° with base 68. Louvers 72 are carried on bent portion 70 and preferably do not extend upwardly beyond the bend line 74. It will be apparent that in this manner the height of the structure is reduced by almost 50 percent without a reduction in heat dissipation surface area.

Figure 7A:
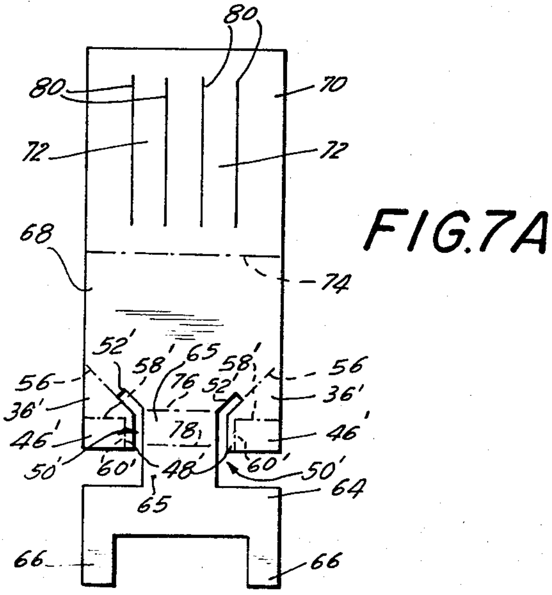
FIG. 7A is a plan view of the sheet metal blank used to form the dissipator of FIG. 7.

The blank used in the fabrication of this embodiment is illustrated in FIG. 7A. It will be noted that the blank may be cut from a rectangular sheet with very little waste. In the formation of the final product the leg portion 62 is bent to the offset configuration along lines 76 and 78, louvers 72 are excised and displaced from portion 70 along cut lines 80, and fingers 36' are folded over onto base 68 in a manner already described with reference to FIGS. 4–6. Finally portion 70 is bent along line 74 to the position shown in FIG. 8.

It will be appreciated from the foregoing that we have provided a light weight, low cost heat dissipator for use with high power semiconductor devices. All of the dissipators described may be fabricated by a simple stamping operation from a strip of sheet metal. The bending operations are preferably carried out automatically by machine on an assembly line. The attachment of the dissipator to the component is a simple manual operation which is carried out without the aid of tools. Moreover, the dissipator is just as easily removed from the component for re-use on another component. The offset legs may be used to stabilize the component on a circuit board to prevent bending or twisting of the thin component leads. The dissipators may be used with a variety of tab and transistor body configurations and are adapted to fit into small spaces and shallow areas.

While only a limited number of embodiments of the present invention have been specifically disclosed herein, it will be apparent that many variations may be made therein, all within the scope of this invention as defined in the appended claims.

We claim:

1. A heat dissipator for use with encased semiconductor devices of the type having a heat conductive tab extending through said casing, comprising a single stamped sheet metal body, said sheet metal body comprising a base portion having at least two fingers integral therewith and extending therefrom, said fingers being bent over to a position substantially parallel to and at least in part spaced from one surface of said base portion, thereby to define a slot at one edge of said base portion adapted to holdingly demountably receive said tab, said tab, when inserted within said slot, being in planar heat conductive engagement with said base portion of said sheet metal body.

2. The heat dissipator of claim 1, wherein said body is an elongated planar sheet of metal and wherein said slot extends substantially in the direction of elongation.

3. The heat dissipator of claim 1, wherein said body is an elongated planar sheet of metal and wherein said slot extends substantially in the direction of elongation, said one edge being substantially perpendicular to said direction of elongation.

4. The heat dissipator of claim 1, wherein a said base portion has two parallel edges substantially perpendicular to said one edge and wherein said fingers are bent along a line at an angle to said one edge and said parallel edges.

5. The heat dissipator of claim 1, wherein said metal body further comprises a device stabilizing portion extending in a plane parallel to said slot and a connecting portion perpendicular to said slot and connecting the slot-forming portion of said body with said device stabilizing portion to form an L-shaped cradle, whereby when said tab is inserted in said slot said device is disposed in said L-shaped cradle abutting said connecting portion.

6. The heat dissipator of claim 1, wherein said metal body further comprises a dissipator portion integral with and extending from said base portion at an acute angle to said base portion.

7. A method of making a heat dissipator for use with encased semiconductor devices of the type having a heat conductive tab extending through said casing comprising the steps of stamping a metal sheet to form a main body portion having two fingers extending therefrom and bending said fingers over toward each other to a position parallel to and at least in part spaced from said main body portion, thereby to form a slot adapted to receive said tab in planar heat conductive engagement with at least one surface of said main body portion.

8. The method of claim 7, wherein said fingers are disposed adjacent to one edge of said main body portion and wherein said fingers are bent along a line at an angle to said one edge.

9. The method of claim 7, wherein said fingers initially extend in a first direction and wherein after being bent to form said slot said fingers extend in a second direction substantially perpendicular to said first direction.

* * * * *